United States Patent [19]

Galli et al.

[11] Patent Number: 4,617,199

[45] Date of Patent: Oct. 14, 1986

[54] PROCESS FOR THE MANUFACTURING OF ADHESIVE TAPES

[75] Inventors: Graziano Galli, Formia; Lucio Penzo, Monza; Felice Pina, Milan, all of Italy

[73] Assignee: Manuli Autoadesivi SpA, Cologno, Italy

[21] Appl. No.: 777,573

[22] Filed: Sep. 19, 1985

Related U.S. Application Data

[63] Continuation of Ser. No. 576,707, Feb. 3, 1984, abandoned.

[30] Foreign Application Priority Data

Feb. 23, 1983 [IT] Italy .................. 19710 A/83

[51] Int. Cl.$^4$ .............................................. B05D 1/14
[52] U.S. Cl. ...................................... 427/208; 427/40; 427/41; 427/223; 427/208.6; 427/208.8
[58] Field of Search .................. 427/208, 208.6, 208.8, 427/40, 41

[56] References Cited

U.S. PATENT DOCUMENTS

| | | | |
|---|---|---|---|
| 3,364,056 | 1/1968 | Seibel et al. | 117/46 |
| 3,543,920 | 12/1970 | Crocker et al. | 427/208 X |
| 4,197,129 | 4/1980 | Muroi et al. | 430/625 |
| 4,421,817 | 12/1983 | Pina et al. | 428/207 |
| 4,424,244 | 1/1984 | Puskadi | 428/40 |

*Primary Examiner*—Bernard D. Pianalto
*Attorney, Agent, or Firm*—Murray and Whisenhunt

[57] ABSTRACT

The present invention relates to the manufacturing of adhesive tapes having a backing consisting of a polypropylene or other olefinic polymer or copolymer film, one side of which is coated by elastomeric or plastomeric adhesive systems (as applied from solutions, emulsions, in a molted condition, etc., according to the technologies known in the art), the other side being coated with or without corona or flame treatment, with antiadhesive systems which facilitate the unwinding operation of the tape either in the processing and in the application, but at the same time may receive printing inks of the flexo-roto-silk-screen type inks suitable for the printing of polyolefinic films. The application of antiadhesive systems which are ink compatible can be carried out either on line, namely during the tape coating process, and on tapes already coated by means of the duly modified printing machine. In some cases there is foreseen the application, immediately after the printing process, of an additional antiadhesive layer to facilitate the unwinding operation and application of the printed tapes.

5 Claims, No Drawings

PROCESS FOR THE MANUFACTURING OF ADHESIVE TAPES

This application is a continuation of Ser. No. 576,707, filed Feb. 3, 1984, now abandoned.

The present invention relates to the manufacturing of printable adhesive tapes, particularly adhesive tapes having a backing of polypropylene or other olefinic polymers of copolymers.

More particularly, the present invention relates to a process for making ready-to-print and the printing of adhesive tapes of the above mentioned type.

The printing of adhesive tapes, even of the type having a backing of a material different from polyolefinic films, is not an easy problem.

The selection of the inks and the printing system, usually of the flexographic type, depends on the backing nature, on the backing condition (e.g. whether it has been previously treated, coated with a smooth or rough anti-adhesive, layer, etc.) and mostly upon the properties and characteristics of the adhesive with which the ink, after the printing is closely contacted, and moreover on the ink nature, on the adhesion thereof to the backing, on the compatibility to each other between the ink and the backing, and finally on the adhesion of the ink to the backing.

As a matter of fact during the unwinding operation of the roll, the adhesive tends to peel up the ink from the back side of the tape.

Besides it is known that in order to evaluate the gripping of inks or points onto a printed or painted surface, there are used adhesive tapes placed closely into contact with the surface itself and violently pulled out therefrom.

It is accordingly necessary to come to a compromise resulting from a balance between the adhesive forces of the adhesive, the unwinding force of the tape and the ink adhesion to the backing.

In order to improve and facilitate the adhesion of the inks to the backing, it is sometimes necessary to coat the same backing with a layer of lacquer or point or any other printing layer, which is more compatible with the inks themselves, and makes the easily anchored, but does not affect either the intrinsic characteristics of the adhesive, due to a migration within the latter (such as the adhesiveness, the tackiness, and so on), or the processing characteristics; a too high winding force causes for example consequent breakages to occur, upon cutting or applying the tape.

The coating with priming lacquers, paints or other primers, is particularly necessary in the case of adhesive tapes having backings of polyolefinic films (manufactured by casting, mono- or bi-oriented), in which the surface tension value is very low, whereby the printing inks do not intimately adhere thereto. The main object of the present invention is that of making ready-to-print and subsequently printing adhesive tapes with a backing of polypropylene or olefinic copolymers without need of a primer coated onto the treated or not treated back side of the backing.

Said object is attained by a process for making ready-to-print and for printing of adhesive tapes onto a backing of polypropylene or olefinic copolymers, in which said backing, after a suitably treatment for increasing the surface tension, has one side thereof coated with a priming layer, and an adhesive layer whereas the opposite side or back side is printed by means of inks which are suitable for polypropilene or similar olefinic polymers, characterized in that said treated or also not treated back side is coated with a release lacquer not requiring a priming coat and compatible with the printing inks. It is thus important to increase the value of the surface tension of the backing (back side of the tape) to increase the affinity thereof towards the inks.

It is also very important that the lacquer or paint or primer intimately adheres to the backing itself, and accordingly the nature of the components thereof should be selected as a function of this property.

Sometimes in order to increase the adhesion to each other between the lacquer, or paint, or primer and the backing it may be necessary to carry out a treatment, by a corona or flame treatment of the baking such as to increase the surface tension of the same and to prepare it for being more compatible with the subsequently applied layer of lacquer or paint.

There is a number of polymers and resins which are considered suitable for preparing release lacquers having the desired characteristics; the following ones are particularly taken into consideration:

acrylic polymers and copolymers as prepared from alkyl esters of acrylic and/or methacrylic acid having 2 to 22 carbon atoms;
modified cellulosic esters and ethers;
polyamide polymers and copolymers modified by cellulosic esters and ethers;
EVA type olefinic copolymers;
halogenated olefinic polymers and copolymers modified by EVA type olefinic copolymers;
polyester modified by long chain acrylic copolymers or by vinylic copolymers;
generally added with adhesion promoting agents and anti-adhesive agents, dissolved in appropriate solvents, with a solid contents from 10 to 40% depending on the cases.

According to the present invention it is possible and foreseen to use additional anti-adhesive compounds.

Generally the following anti-adhesives are used:
polyvinylcarbamates;
hemiesters and hemitamides of long chain aliphatic compounds;
acrylic esters of long chain aliphatic alcohols,;
dissolved in appropriate solvents at a concentration of 0.2–0.5%

For the printing there are used inks, suitable for the printing of polyolefinic backings, based on:
polyamide resins,
cellulosic derivatives;
vinyl or vinylacrylic resins;
halogenated polyolefinic resins.

The operating cycle for the preparation of printed adhesive tapes, having a polypropylene backing, can be the following:

(a) applying the lacquer on line with the coating operation; one side of the previously treated polypropylene film backing (corona or flame treatment) is coated with a priming layer and an adhesive layer. The nature and the composition of the priming and of the adhesive layers are well known to the skilled in the art of adhesive tape manufacturing and several application methods are also known.

The other side of the backing, either treated or not, depending on whether it is requested by the nature of the lacquer, with a corona effect or flame treatment, so as to bring the value of the surface tension to at least 36 dynes/cm, is coated with the lacquer layer to be printed.

The lacquer application is generally carried out via rotogravure system and the amount of the solid substance as applied is of about 0.5–2.5 g/sq.m.

The step of applying the lacquer and rendering the backing adhesive on line is carried out in a single equipment of the multiple-head type. The thus obtained coated tape type is wound and sent to the cutting where it is unwound, cut into rolls of suitable sizes and is ready for print.

The printing step is carried out generally by the flexographic system, by suitably modified printing machines so as to permit also an additional layer of ahdesive to be applied.

(b) application of the lacquer during the printing; in this case the adhesive tape is manufactured by the traditional systems which are well known the manufacturers, by applying to one side of the treated backing the priming and the adhesive layer and to the other side the anti-adhesive layer normally necessary for the cutting into rolls and for the end use.

The tape cut into rolls is transferred to the printing machine wherein, in a first unit, the lacquer layer is applied to the non-adhesive side.

After the lacquer is dried, the roll is printed, and after being printed the additional anti-adhesive layer is applied.

The success of the printing operation is depending on the type of lacquers,s on the type of ink, on the printing and ink dyring rates, and on the amount, kind or application method of the anti-adhesive as added.

For the checking of a printed adhesive tape, besides evaluating the organoleptic properties, which are essentially represented by the "offsett" phenomenon, namely the removal of the lacquer or of the print by the adhesive, the measuring of the adhesiveness with respect to a steel surface or to support, the unwinding force, the tackniness, etc. are also evaluated.

EXAMPLES

For a better understanding of the present invention, the following illustrative, but not limitative, examples of lacquer formulations, as reported in Table I hereinafter, are given.

The alleged abbreviations are given for the table explanation.

CAB = cellulose acetobutyrate 1/10 sec type (Eastman Chemical Co.) in a 20% solution in a mixture of ethyl methylketone/toluene 1/1;

CM = nitrocellulose ½ sec. (Hercules Powder Co.) in a 20% solution in a mixture of isopropylic alcohol-/ethylacetate 1/1;

PA = Polyamide resin Versamid 961 (Shering Co.) in a 20% solution in a mixture of isopropylic alcohol/hexane 1/1;

AC = acrylonitrile-stearyl acrylate copolymer (30/70) in a 10% toluene solution;

POCl = chlorinated polyolefin Hardlen 15LP (Toyokashi Kogyo Co.) in a 10% toluene solution;

VIN = vinyl copolymer Vilit AS 42 (Chemische Werke Huels) in a 20% solution in a mixture of methylketone/toluene 1/1;

PE = polyester resin Vitel PE222 (Goodyear Chemical Co.) in a 20% solution in a mixture of dioxane/-toluene 7/3;

EVA = ethylene-vinylacetate copolymer E Elvax 40 (Du Pont).

The inks used for the printing were:
rotoflexographic ink GR 7770/133 manufactured by the firm Buglini of Florence;
pyroflex series inks manufactured by Inmont Italy.

Additional antiadhesive: polyvinilcarbamate 0.1–1% toluene solution.

Adhesion promoter: organo-functional silanes of the type Dow Corning 26031 Silane, sold by Dow Corning International.

TABLE 1

| Ex. no. | RESIN comp. | CAB p.p. | CN p.p. | PA p.p. | AC p.p. | POCl p.p. | VIN p.p. | PET p.p. | EVA p.p. | Adhesion Prom. p.p. | Properties print transfer | unwinding force gr/cm | adhesion on steel surface gr/cm |
|---|---|---|---|---|---|---|---|---|---|---|---|---|---|
| 1 | CAB | 100 | — | — | — | — | — | — | — | — | yes | 160 | 250 |
| 2 | CAB + PA | 50 | — | 50 | — | — | — | — | — | 1 | light | 170 | 225 |
| 3 | CAB + PA + AC | 30 | — | 30 | 30 | — | — | — | — | — | light | 150 | 200 |
| 4 | CN | — | 100 | — | — | — | — | — | — | — | yes | 160 | 200 |
| 5 | CN + PA | — | 50 | 50 | — | — | — | — | — | 1 | light | 170 | 190 |
| 6 | CN + PA + AC | — | 30 | 30 | 30 | — | — | — | — | — | absent | 120 | 200 |
| 7 | PA | — | — | 100 | — | — | — | — | — | — | yes | 200 | 210 |
| 8 | PA + AC | — | — | 50 | 50 | — | — | — | — | — | light | 120 | 180 |
| 9 | PA + AC | — | — | 50 | 50 | — | — | — | — | 1 | absent | 130 | 180 |
| 10 | POCl | — | — | — | — | 100 | — | — | — | 1 | absent | 220 | 200 |
| 11 | POCl + VIN | — | — | — | — | 80 | 20 | — | — | — | absent | 200 | 220 |
| 12 | AC + POCl | — | — | — | 20 | 80 | — | — | — | — | absent | 140 | 200 |
| 13 | POCl + EVA | — | — | — | — | 80 | — | — | 20 | — | absent | 180 | 200 |
| 14 | POCl + EVA | — | — | — | — | 50 | — | — | 50 | — | absent | 190 | 210 |
| 15 | CN + PA + PET | — | 20 | 40 | — | — | — | 40 | — | 1 | light | 150 | 180 |
| 16 | CAB + PA + PET | 20 | — | 40 | — | — | — | 40 | — | 1 | light | 180 | 180 |
| 17 | PA + Vin + PET | — | — | 40 | — | — | 20 | 40 | — | 1 | absent | 180 | 200 |
| 18 | AC + PET | — | — | — | 40 | — | 40 | 20 | — | 1 | light | 150 | 190 |
| 19 | AC + POCl + PET | — | — | — | 30 | 30 | — | 30 | — | — | absent | 130 | 200 |
| 20 | AC + POCl | — | — | — | 50 | 50 | — | — | — | — | absent | 120 | 180 |
| 21 | AC + EVA + POCl | — | — | — | 30 | 30 | — | — | 30 | 1 | absent | 140 | 190 |
| 22 | — | — | — | — | — | — | — | — | — | — | yes | 200 | — |

We claim:

1. A process for making printable adhesive tape, said process comprising the steps of:
   providing a backing of polypropylene or other olefinic copolymers, said backing having an adhesive side and a back side;
   treating said backing to increase its surface tension;
   coating said adhesive side with a priming layer and an adhesive layer;

coating said back side with a release lacquer, said release lacquer not requiring primer, and being compatible with printing inks, said release lacquer being selected from the group consisting of chlorinated polyolefins, ethylene-vinyl acetate copolymer, and acrylonitrile-stearyl acetate copolymer.

2. A process according to claim 1, wherein said back side of said backing layer is treated to increase the surface tension.

3. A process according to claim 1, wherein said release lacquer is applied to said backing immediately before printing, with or without said back side being treated for increasing the surface tension thereof.

4. A process according to claim 1, wherein said back side, after being printed, is further coated with an anti-adhesive compound selected from vinyl esters of long chain fatty alcohols, polyvinyl carbamates, and hemiamides or hemiesters of long chain aliphatic compounds.

5. A process according to claim 1, wherein said anti-adhesive compound is in the form of a solution in an organic solvent or in the form of an aqueous dispersion.

* * * * *